(12) United States Patent
Sasagawa et al.

(10) Patent No.: US 8,885,016 B2
(45) Date of Patent: Nov. 11, 2014

(54) OMNIDIRECTIONAL CAMERA AND LENS HOOD

(75) Inventors: Jun Sasagawa, Tokyo-to (JP); Hirokazu Yamada, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 342 days.

(21) Appl. No.: 13/426,666

(22) Filed: Mar. 22, 2012

(65) Prior Publication Data

US 2012/0242786 A1     Sep. 27, 2012

(30) Foreign Application Priority Data

Mar. 24, 2011 (JP) .................... 2011-066186
Mar. 24, 2011 (JP) .................... 2011-066187
Apr. 4, 2011 (JP) .................... 2011-082755

(51) Int. Cl.
*H04N 5/225* (2006.01)
*H04N 5/247* (2006.01)
*G03B 11/04* (2006.01)
*H04N 5/232* (2006.01)

(52) U.S. Cl.
CPC .............. *H04N 5/247* (2013.01); *G03B 11/04* (2013.01); *H04N 5/23238* (2013.01)
USPC ....... 348/36; 348/143; 348/E05.026; 396/534

(58) Field of Classification Search
CPC ...... G03B 11/04; G03B 11/045; G03B 17/08; G03B 37/00
USPC ................ 348/36, 143, E05.026; 396/534
See application file for complete search history.

(56) References Cited

U.S. PATENT DOCUMENTS

| | | | |
|---|---|---|---|
| 4,320,949 A | 3/1982 | Pagano | |
| 4,769,711 A | 9/1988 | Date | |
| 5,041,719 A | 8/1991 | Harris et al. | |
| 5,130,794 A | 7/1992 | Ritchey | |
| 6,141,034 A | 10/2000 | McCutchen | |

(Continued)

FOREIGN PATENT DOCUMENTS

| | | |
|---|---|---|
| DE | 60105068 T2 | 12/2004 |
| EP | 1368703 B1 | 8/2004 |

(Continued)

OTHER PUBLICATIONS

German communication dated Sep. 18, 2013 in co-pending German patent application No. DE 10 2012 005 726.1.

(Continued)

*Primary Examiner* — Sath V Perungavoor
*Assistant Examiner* — Daniel Chang
(74) *Attorney, Agent, or Firm* — Nields, Lemack & Frame, LLC (57) ABSTRACT

An omnidirectional camera comprises a camera assembly 2 having two or more horizontal camera units 6 provided radiantly and a cover 4 for accommodating the camera assembly, and in the omnidirectional camera, a lens hole 37, through which an objective lens of the horizontal camera units come out, is formed on the cover, a lens hood 38 is provided on the cover concentrically with the lens hole, the lens hood has a shape of surface which does not intercept a field angle of the horizontal camera units, and a maximum height of the lens hood is larger than a protruding amount of the objective lens from the cover.

4 Claims, 8 Drawing Sheets

(56) References Cited

U.S. PATENT DOCUMENTS

| | | | |
|---|---|---|---|
| 6,201,574 B1 | 3/2001 | Martin | |
| 6,354,749 B1 | 3/2002 | Pfaffenberger, II | |
| 7,043,280 B1 | 5/2006 | Shields et al. | |
| 7,366,553 B1 | 4/2008 | Shields et al. | |
| 7,391,298 B1 | 6/2008 | Campbell et al. | |
| 7,552,025 B2 | 6/2009 | Ohtomo et al. | |
| 7,627,235 B2 | 12/2009 | McCutchen et al. | |
| 7,773,121 B1 | 8/2010 | Huntsberger et al. | |
| 8,228,364 B2 | 7/2012 | Cilia | |
| 2004/0048507 A1 | 3/2004 | Hage | |
| 2004/0151492 A1* | 8/2004 | Blok et al. | 396/534 |
| 2005/0030392 A1* | 2/2005 | Lee et al. | 348/241 |
| 2006/0075450 A1 | 4/2006 | Haas et al. | |
| 2006/0132602 A1 | 6/2006 | Muto et al. | |
| 2007/0181555 A1 | 8/2007 | Clough et al. | |
| 2007/0217782 A1 | 9/2007 | McCutchen et al. | |
| 2008/0055409 A1* | 3/2008 | Mars et al. | 348/143 |
| 2009/0082629 A1 | 3/2009 | Dotan et al. | |
| 2009/0112389 A1 | 4/2009 | Yamamoto et al. | |
| 2009/0251530 A1 | 10/2009 | Cilia | |
| 2009/0323121 A1 | 12/2009 | Valkenburg et al. | |
| 2010/0201203 A1 | 8/2010 | Schatz et al. | |
| 2010/0270014 A1 | 10/2010 | Huang | |
| 2012/0057852 A1 | 3/2012 | Devleeschouwer et al. | |
| 2012/0242785 A1 | 9/2012 | Sasagawa et al. | |
| 2012/0242837 A1 | 9/2012 | Sasagawa et al. | |

FOREIGN PATENT DOCUMENTS

| | | |
|---|---|---|
| EP | 2306230 A1 | 4/2011 |
| JP | 2007-171048 A | 7/2007 |
| WO | 2005/048586 A1 | 5/2005 |

OTHER PUBLICATIONS

German communication dated Sep. 18, 2013 in co-pending German patent application No. DE 10 2012 005 728.8.

German communication dated Sep. 18, 2013 in corresponding German patent application No. DE 10 2012 005 729.6 .

IEEE Transactions on Robotics and Automation, vol. 16, No. 6, Dec. 2000, pp. 890-898, "Vision-based Navigation and Environmental Representations with an Omni-directional Camera", Gaspar, et al.

2007 IEEE International Conference on Robotics and Automation, Apr. 10-14, 2007, pp. 3945-3950, "Single View Point Omnidirectional Camera Calibration from Planar Grids", Mei, et al.

Proceedings of the World Congress on Engineering and Computer Science 2007, Oct. 24-26, 2007 (WCECS 2007), pp. 1-6, "Combined Convection and Radiation Heat Transfer from a Fin Array with a Vertical Base and Horizontal Fins", Rao, et al.

Office Action mailed Jun. 23, 2014 in co-pending U.S. Appl. No. 13/426,661.

Canadian communication dated Apr. 3, 2014 in corresponding Canadian patent application No. 2,772,210.

* cited by examiner

FIELD ANGLE Wc IN DIAGONAL DIRECTION

FIELD ANGLE Wb IN LONG SIDE DIRECTION

FIELD ANGLE Wa IN SHORT SIDE DIRECTION

FIG.8

DIAGONAL DIRECTION OF IMAGE PICKUP ELEMENT

LONG SIDE DIRECTION OF IMAGE PICKUP ELEMENT

SHORT SIDE DIRECTION OF IMAGE PICKUP ELEMENT

OMNIDIRECTIONAL CAMERA AND LENS HOOD

BACKGROUND OF THE INVENTION

The present invention relates to an omnidirectional camera which is provided with a plurality of cameras and which takes an image of an omnidirectional view and a lens hood of the camera.

In the omnidirectional camera, a plurality of cameras are accommodated radiantly inside a casing and the cameras have a wide field angle lens (a wide angle lens) or a fish-eye lens. The omnidirectional camera is often used in the field and the casing is required to have a waterproof structure. Accordingly, a wind hole is liquid-tightly covered by a transparent member such as a plane glass. In a case where the plane glass is liquid-tightly provided, in general, a seal member such as O ring or the like is used for a supporting portion of the plane glass.

Figure 10:
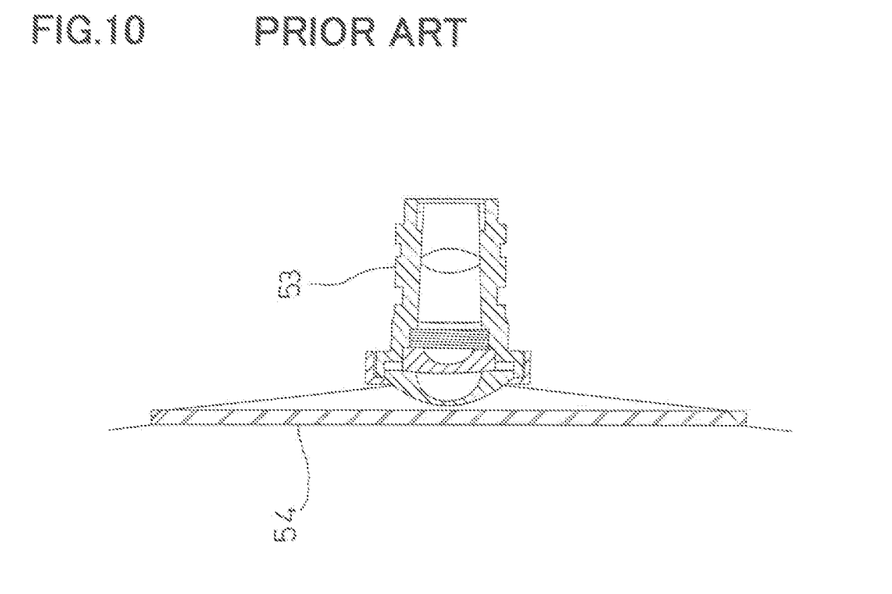
FIG. 10 is an explanatory view to show a relation between a conventional lens unit and a wind hole and a plane glass.

As described above, the wide angle lens or the fish-eye lens is used for the camera, and the casing, which accommodates the camera, is required to have a wide wind hole corresponding to each lens in order to secure a wide field angle of the lens. In particular, in a super-wide angle lens 53 whose field angle of the lens exceeds 160°, as the wind hole becomes larger, a plane glass 54 becomes larger. Accordingly, the casing upsizes, a size of the omnidirectional camera gets larger and furthermore, the omnidirectional camera is costly. (See FIG. 10)

Figure 11:
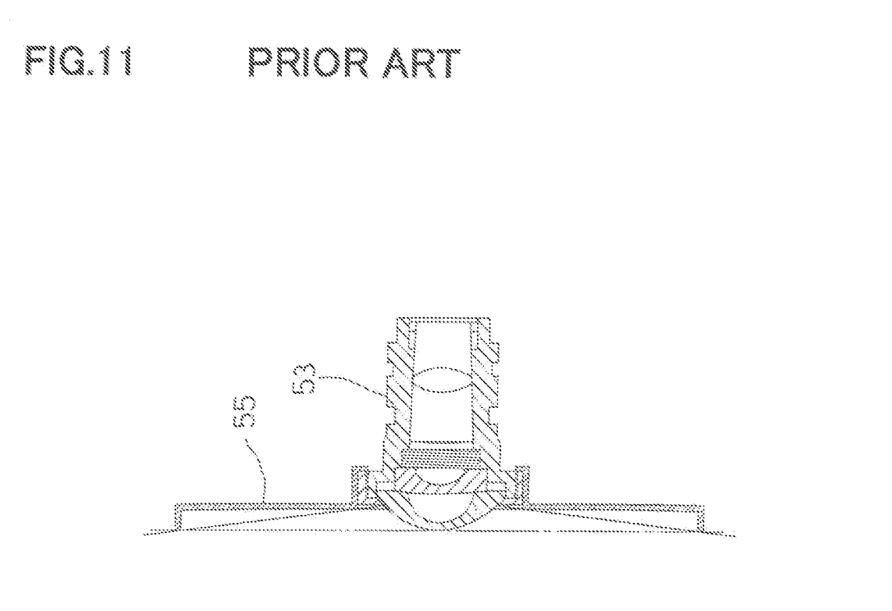
FIG. 11 is an explanatory view to show a relation between a conventional lens unit and the lens hood.

In order to downsize the casing, if the lens is configured to protrude from the casing, a lens hood 55 is required for protecting the lens. However, in order to secure the field angle of the lens, the lens hood 55 upsizes, and the casing also upsizes. (See FIG. 11)

SUMMARY OF THE INVENTION

It is an object of the present invention to provide a lens hood which secures a field angle of a wide angle lens and protects a lens and to attempt a miniaturization of a omnidirectional camera in which a plurality of cameras are mounted.

To attain the above object, an omnidirectional camera according to the present invention comprises a camera assembly having two or more horizontal camera units provided radiantly and a cover for accommodating the camera assembly, and in the omnidirectional camera, a lens hole, through which an objective lens of the horizontal camera units come out, is formed on the cover, a lens hood is provided on the cover concentrically with the lens hole, the lens hood has a shape of surface which does not intercept a field angle of the horizontal camera units, and a maximum height of the lens hood is larger than a protruding amount of the objective lens from the cover.

Further, in the omnidirectional camera according to the present invention, the camera assembly has a vertical camera unit directed to a vertical direction.

Further, in the omnidirectional camera according to the present invention, the camera assembly has a liquid-tight structure and the cover has a ventilation.

Further, in the omnidirectional camera according to the present invention, the horizontal camera unit has a rectangle image pickup element, a shape of the lens hood is square, a shape of surface of the lens hood is designed so that a height of portion parallel to a short side of the image pickup element is lower than a height of portion parallel to a long side of the image pickup element, and a concave curved surface is formed along a diagonal line in a diagonal direction.

Further, in the omnidirectional camera according to the present invention, the vertical camera unit has a rectangle image pickup element, a shape of the lens hood is square, a shape of surface of the lens hood is designed so that a height of portion parallel to a short side of the image pickup element is lower than a height of portion parallel to a long side of the image pickup element, and a concave curved surface is formed along a diagonal line in a diagonal direction.

Further, in the lens hood according to the present invention which is provided concentrically with lens units of a wide angle camera unit, a shape of surface of the lens hood is a shape which does not intercept a field angle of the wide angle camera unit, and a maximum height of the lens hood is higher than a forward end of the lens units.

According to the present invention, the omnidirectional camera comprises a camera assembly having two or more horizontal camera units provided radiantly and a cover for accommodating the camera assembly, and in the omnidirectional camera, a lens hole, through which an objective lens of the horizontal camera units come out, is formed on the cover, a lens hood is provided on the cover concentrically with the lens hole, the lens hood has a shape of surface which does not intercept a field angle of the horizontal camera units, and a maximum height of the lens hood is larger than a protruding amount of the objective lens from the cover. As a result, a diameter of the lens hole formed on the cover suffices for a diameter which is equivalent to an outside diameter of a lens unit, and it is possible to miniaturize a size of the cover. Also, it is possible to attempt a decrease of the cost because it is unnecessary to cover the lens hole by a plane glass.

Further, according to the present invention, in the omnidirectional camera, the camera assembly has a vertical camera unit directed to a vertical direction. As a result, it is possible to acquire an image of the vertical direction.

Further, according to the present invention, in the omnidirectional camera, the camera assembly has a liquid-tight structure and the cover has a ventilation. As a result, a heat from the camera assembly is not stored in the cover and it is possible to release the heat effectively.

Further, according to the present invention, in the omnidirectional camera, the horizontal camera unit has a rectangle image pickup element, a shape of the lens hood is square, a shape of surface of the lens hood is designed so that a height of portion parallel to a short side of the image pickup element is lower than a height of portion parallel to a long side of the image pickup element, and a concave curved surface is formed along a diagonal line in a diagonal direction. As a result, a field angle of the horizontal camera unit is not intercepted and it is possible to prevent a damage and a breakage of the lens unit.

Further, according to the present invention, in the omnidirectional camera, the vertical camera unit has a rectangle image pickup element, a shape of the lens hood is square, a shape of surface of the lens hood is designed so that a height of portion parallel to a short side of the image pickup element is lower than a height of portion parallel to a long side of the image pickup element, and a concave curved surface is formed along a diagonal line in a diagonal direction. As a result, a field angle of the vertical camera unit is not intercepted and it is possible to prevent the damage and the breakage of the lens unit.

Furthermore, according to the present invention, in the lens hood which is provided concentrically with lens units of a wide angle camera unit, a shape of surface of the lens hood is a shape which does not intercept a field angle of the wide angle camera unit, and a maximum height of the lens hood is higher than a forward end of the lens units. As a result, it is possible to protect the lens in smaller shape without missing a function of a camera unit.

DETAILED DESCRIPTION OF THE PREFERRED EMBODIMENTS

Description will be given on embodiments of the present invention by referring to the attached drawings.

First, referring to FIG. 1 to FIG. 5, description will be given on an omnidirectional camera to which the present invention is applied.

The omnidirectional camera 1 mainly includes a camera assembly 2, an image processing unit 3 accommodating an image processing integrated circuit, an electronic circuit, and others, a heat shield cover 4 which accommodates the camera assembly 2 and has a good ventilation, and lens hoods 38 which are provided in the heat shield cover 4.

The camera assembly 2 has a camera mounting frame 5 made of a metal material with good heat transfer properties such as aluminum or copper or the like, the camera mounting frame 5 is a cylindrical hollow body having a circular cross section, and four horizontal camera units 6 and a vertical camera unit 7 are provided in the camera mounting frame 5. A total of four horizontal camera units 6 are present on a horizontal plane orthogonal to a center line of the camera mounting frame 5, and each two-unit is arranged respectively on two center lines perpendicular to each other. An optical axis of the horizontal camera units 6 is parallel to or coincides with the center lines. Further, the vertical camera unit 7 is arranged at an upper end of the camera mounting frame 5 so as to coincide with the center line of the camera mounting frame 5. An optical axis of the vertical camera unit 7 coincides with the center line of the camera mounting frame 5 and is vertical. It is to be noted that the camera mounting frame 5 may be a cylindrical hollow body having a polygonal cross section. Two, or three, or five or more horizontal camera units 6 may be provided radiantly.

The horizontal camera unit 6 comprises a first mount block 8, a first lens unit 9 inserted into the first mount block 8 from the outside in the radial direction, and a first image pickup element 10 (see FIG. 3) arranged at a focal position of the first lens unit 9, and the first mount block 8 is made of a material with good heat transfer properties, e.g., a metal material such as aluminum or copper or the like. The first image pickup element 10 has a rectangle photodetection surface and the photodetection surface extends in vertical direction.

Heat radiation fins 20 are formed in a horizontal direction at portions of the camera mounting frame 5 where the horizontal camera units 6 are not installed, and the heat radiation fins 20 are provided at a predetermined pitch in a vertical direction.

The first mount block 8 has a block portion 8a protruding toward the central side and a flange portion 8b bulging around the block portion 8a. The first mount block 8 is inserted from the outside in such a manner that the block portion 8a penetrates the camera mounting frame 5. The flange portion 8b and the camera mounting frame 5 are closely fitted to each other through a metallic contact, and the flange portion 8b is fixed to the camera mounting frame 5 by a securing means such as a bolt or the like. A seal ring 11 is interposed between the flange portion 8b and the camera mounting frame 5, and the first mount block 8 and the camera mounting frame 5 are liquid tightly sealed.

The first lens unit 9 has a lens group 46, a body tube 47 to accommodate the lens group 46, and an objective lens 48 provided on an outer end of the body tube 47. A seal ring 49 is provided between the objective lens 48 and the body tube 47 and the first lens unit 9 itself has a liquid-tight structure.

The first lens unit 9 is inserted in the first mount block 8 and is assembled by screwing. A seal ring 12 is interposed between the first mount block 8 and the first lens unit 9, and the first lens unit 9 is liquid-tightly supported.

A first circuit board 13 is disposed to an inner surface of the first mount block 8, and the first image pickup element 10 is mounted on the first circuit board 13. Moreover, a ground layer is formed on a front-side surface (that is a surface which is in contact with the first mount block 8) of the first circuit board 13, and the first circuit board 13 is in contact with the first mount block 8 through the ground layer.

The vertical camera unit 7 comprises a second mount block 14, a second lens unit 15 inserted into the second mount block 14 from above, and a second image pickup element 16 (see FIG. 3) arranged at a focal position of the second lens unit 15, and the second mount block 14 is made of a metal material with good heat transfer properties, e.g., the aluminum or the copper or the like. The second image pickup element 16 has a rectangle photodetection surface and the photodetection surface extends in a direction perpendicular to a sheet of the drawing (See FIG. 3).

Additionally, the second mount block 14 has a nearly discoid shape, and has a block portion 14a extending in up-and-down direction through the central part and a circular flange portion 14b formed concentrically with the block portion 14a. Triangular heat radiation fins 21 are formed on an upper surface of the flange portion 14b at a predetermined angular pitch with the block portion 14a as the center and the heat radiation fins 21 extend radiantly from the block portion 14a.

The second lens unit 15 has the same structure of the first lens unit 9 and the second lens unit 15 itself has a liquid-tight structure. The second lens unit 15 is inserted in the second mount block 14 and is assembled by screwing. A seal ring 17 is provided between the second mount block 14 and the second lens unit 15, and the second lens unit 15 and the second mount block 14 are liquid-tightly sealed.

The second mount block 14 is disposed in an upper end of the camera mounting frame 5 in such a manner that the second mount block 14 covers an opening of the upper end, the upper end of the camera mounting frame 5 and the flange portion 14b are closely fitted to each, other through a metal contact, and the flange portion 14b is fixed to the camera mounting frame 5 by the securing means such as a bolt or the like. A seal ring 18 is provided between the upper end of the camera mounting frame 5 and the flange portion 14b, and the camera mounting frame 5 and the second mount block 14 are liquid-tightly sealed.

A second circuit board 19 is disposed to a lower surface of the second mount block 14, and the second image pickup element 16 is mounted on the second circuit board 19. Further, a ground layer is formed on an upper surface (that is a surface which is in contact with the second mount block 14) of the second circuit board 19, and the second circuit board 19 is in contact with the second mount block 14 through the ground layer.

A flange 22 is formed at a lower end of the camera mounting frame 5, the image processing unit 3 is disposed to a lower surface of the flange 22, a seal ring 23 is interposed between the image processing unit 3 and the flange 22, and the image processing unit 3 and the flange 22 are liquid-tightly sealed.

The image processing unit 3 has a bottom case 24 and a circuit board 25 accommodated in the bottom case 24, and an image processing integrated circuit 26 is mounted on a back surface of the circuit board 25. A heat transfer portion 27 is provided to protrude at a position of the bottom case 24 where the heat transfer portion 27 faces the image processing integrated circuit 26, and the heat transfer portion 27 is in contact with the image processing integrated circuit 26 through a heat transfer member 28. As the heat transfer member 28, for example, the thermally-conductive sponge, e.g., insulative silicon rubber or the like is used.

The bottom case 24 and the heat transfer portion 27 are preferably integrally molded, and the bottom case 24 is made of a metal material with good heat transfer properties, e.g., the aluminum or the copper. The heat transfer member 28 and the heat transfer portion 27 function as a heat transfer path through which a heat generated by the circuit board 25 is transmitted to the bottom case 24.

The camera assembly 2 constitutes a liquid-tight structure by the camera mounting frame 5, the horizontal camera units 6 mounted on the camera mounting frame 5, the vertical camera unit 7, and the image processing unit 3. Furthermore, the camera mounting frame 5, the first mount block 8, the second mount block 14, and the bottom case 24 are made of metal materials with good heat transfer properties, the heat radiation fins 20 and the heat radiation fins 21 are formed, and the camera assembly 2 itself has a function as a heat radiator.

The heat shield cover 4 is provided so as to accommodate the camera assembly 2, and in a state that the camera assembly 2 is accommodated, a lower heat insulating member 31 and an upper heat insulating member 32 are interposed between the camera assembly 2 and the heat shield cover 4. As a material for the lower heat insulating member 31 and the upper heating insulating member 32, for example, a material with the low heat transfer properties such as a polyacetal resin or the like is used.

The heat shield cover 4 is formed into an octagonal prism whose cross section is octagonal. The octagonal shape is formed by alternately arranging long sides and short sides, and the two pairs of opposite long sides and the two pairs of opposite short sides are parallel to each other, respectively.

A slit 36 is formed between each side surface including the long side (which will be referred to as a long-side surface 34 hereinafter) and each side surface including the short side (which will be referred to as a short-side surface 35 hereinafter) along a ridge line, and the long-side surface 34 and the short-side surface 35 are separated from each other by the slit 36.

The long-side surfaces 34 face the horizontal camera units 6, and a lens hole 37 is formed in the long-side surface 34 concentrically with an optical axis of the horizontal camera unit 6. A diameter of the lens hole 37 is set larger than a diameter of an end portion of the first lens unit 9. In a state that the camera assembly 2 is accommodated in the heat shield cover 4, the objective lens 48 protrudes from a surface of the long-side surface 34 and a gap is formed around the first lens unit 9.

Figure 6:
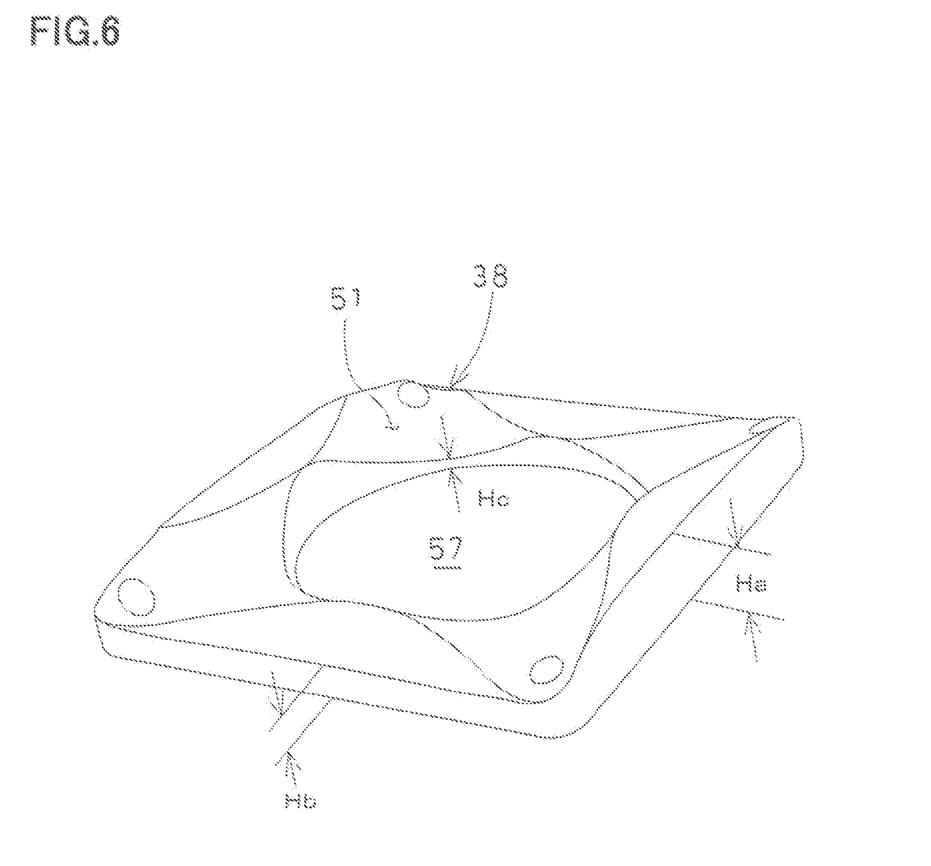
FIG. 6 is a perspective view of a lens hood used for the omnidirectional camera.

Moreover, the lens hood 38 is mounted on long-side surface 34 concentrically with the lens hole 37. Referring to FIG. 6, description will be given on the lens hood 38.

The lens hood 38 has a square outer shape and a hole 57 is formed at the center of the lens hood 38. The hole 57 has the same or nearly the same diameter as a diameter of the lens hole 37. A surface of the lens hood 38 is formed of a curved surface which does not intercept a field angle of the horizontal camera unit 6, and a maximum height (a height from the long-side surface 34) of the surface of the lens hood 38 is higher than a height of a maximum protruding portion of the first lens unit 9.

When the horizontal camera unit 6 acquires the image, a field angle is limited according to a shape of the first image pickup element 10, in addition to a maximum field angle which the first lens unit 9 has.

That is, in a case where the shape of the first image pickup element 10 is rectangle, a field angle Wa in a short side direction is small and a field angle Wb in a long side direction is larger than the field angle Wa and a field angle Wc in a diagonal direction is maximum. (See FIG. 7 and FIG. 8)

Figure 7:
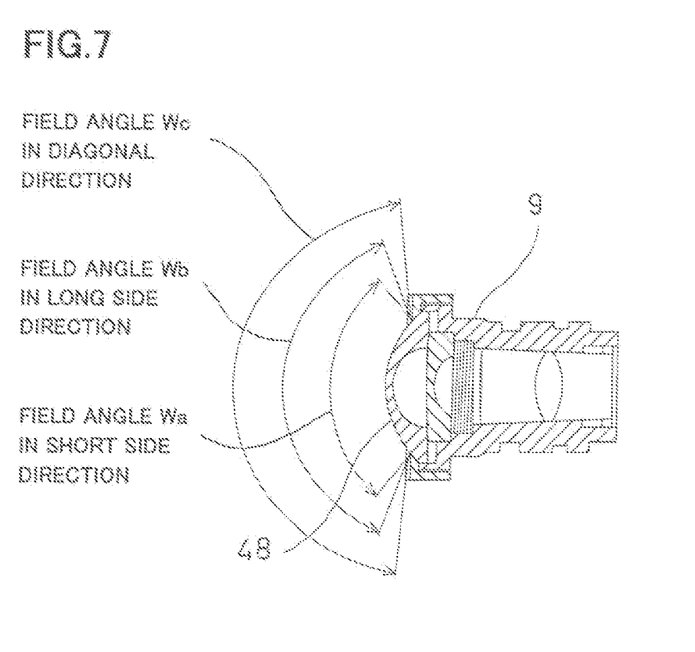
FIG. 7 is an explanatory view to show a relation between a lens unit used for the omnidirectional camera and a field angle.
Figure 8:
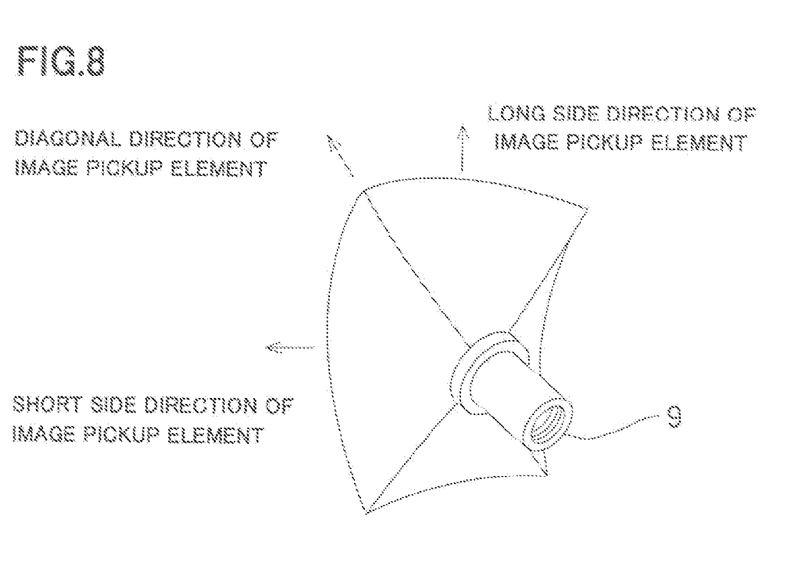
FIG. 8 is an explanatory perspective view to show the relation between the lens unit and the field angle.

Therefore, a curved surface on a surface of the lens hood 38 is formed so as not to intercept the field angles Wa, Wb and Wc. That is, if it is assumed that the lens hood 38 has a square outer shape and a height of portion parallel to a long side of the first image pickup element 10 is Ha, a height of portion parallel to a short side of the first image pickup element 10 is Hb (<Ha) and a concave curved surface 51 is formed along a diagonal line in a diagonal direction. A height of the concave curved surface 51 at an edge of the hole 57 is Hc (<Hb). Further, a field angle in the diagonal direction of the concave curved surface 51 is equal or larger than a maximum field angle of the first lens unit 9. The surface of the lens hood 38 is configured as described above. Therefore, it is possible to secure the field angle and to provide a protruding portion protruding more than the forefront surface of the lens and further, to intercept a light outside of the field angle effectively.

The maximum height Ha of the lens hood 38 is larger than a protruding amount of the objective lens 48 from a surface of the long-side surface 34.

The lens hole 37 is likewise formed in a ceiling surface of the heat shield cover 4 concentrically with an optical axis of the second lens unit 15, and the lens hood 38 is mounted on the ceiling concentrically with the lens hole 37. The lens hood 38 protects the objective lens 48 which protrudes from the heat shield cover 4.

The lower heat insulating member 31 is constituted of four member pieces 31a in protrusion shape and fixing member pieces 31b with arc shape attached so as to link with the adjacent member pieces 31a. The member pieces 31a are fixed to the lower portion of the camera mounting frame 5 by screws in a state that the member pieces 31a are put on the flange 22, and the fixing member pieces 31b are fixed to the member pieces 31a by screws so as to sandwich lower ends of the short-side surfaces 35 between the fixing member pieces 31b and the end surfaces of the member pieces 31a.

Additionally, the upper heat insulating member 32 has a ring shape with a hole 41 into which the second mount block 14 can be inserted, an outer shape of the upper heat insulating member 32 is a regular octagon, and convex portions 43 are formed on an upper surface every other side. The upper heat insulating member 32 is installed on the upper surface of the second mount block 14.

In a state that the member pieces 31a are installed on the camera mounting frame 5 and the upper heat insulating member 32 is installed on the second mount block 14, the heat shield cover 4 is put on the camera assembly 2 from above the second mount block 14 in such manner that the camera assembly 2 is accommodated in the heat shield cover 4. The heat shield cover 4 is secured to the convex portions 43 by screws piercing through the ceiling surface of the heat shield cover 4. Furthermore, the fixing member pieces 31b are fixed.

Figure 1:
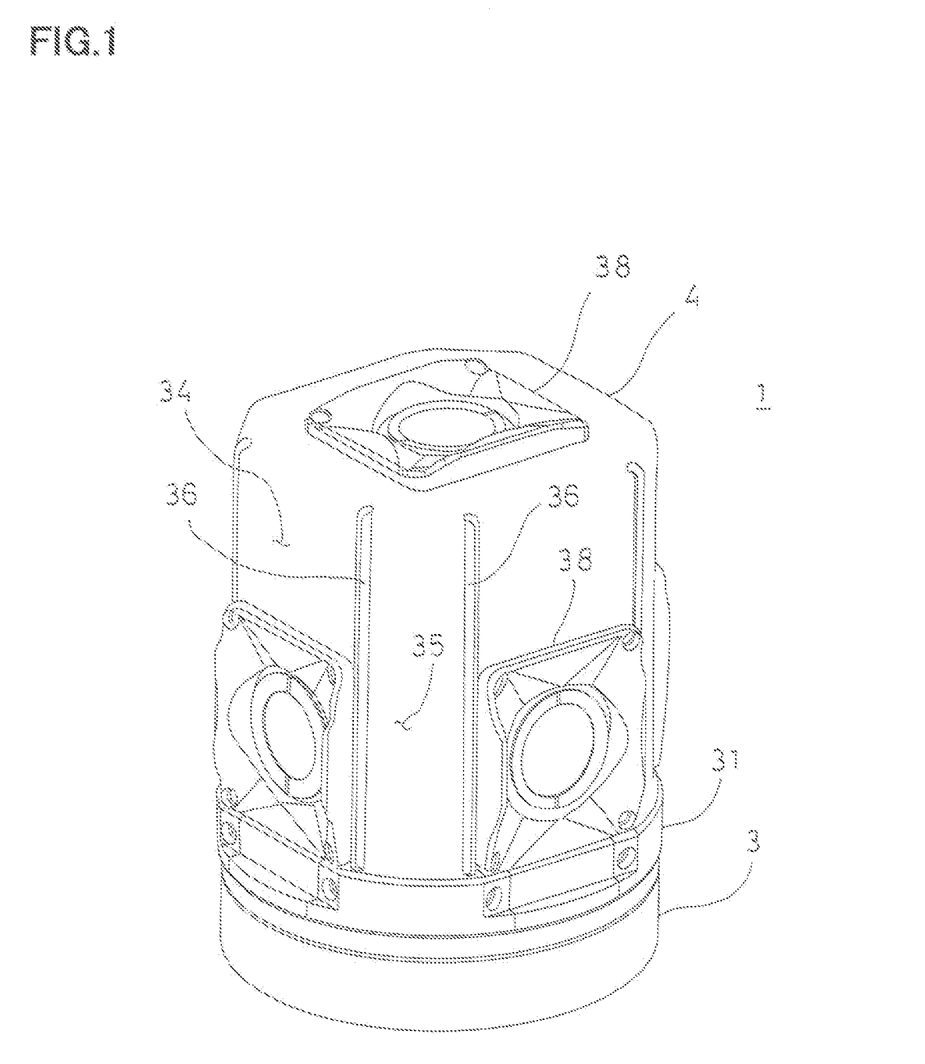
FIG. 1 is a perspective view of an omnidirectional camera to which the present invention is applied.
Figure 2:
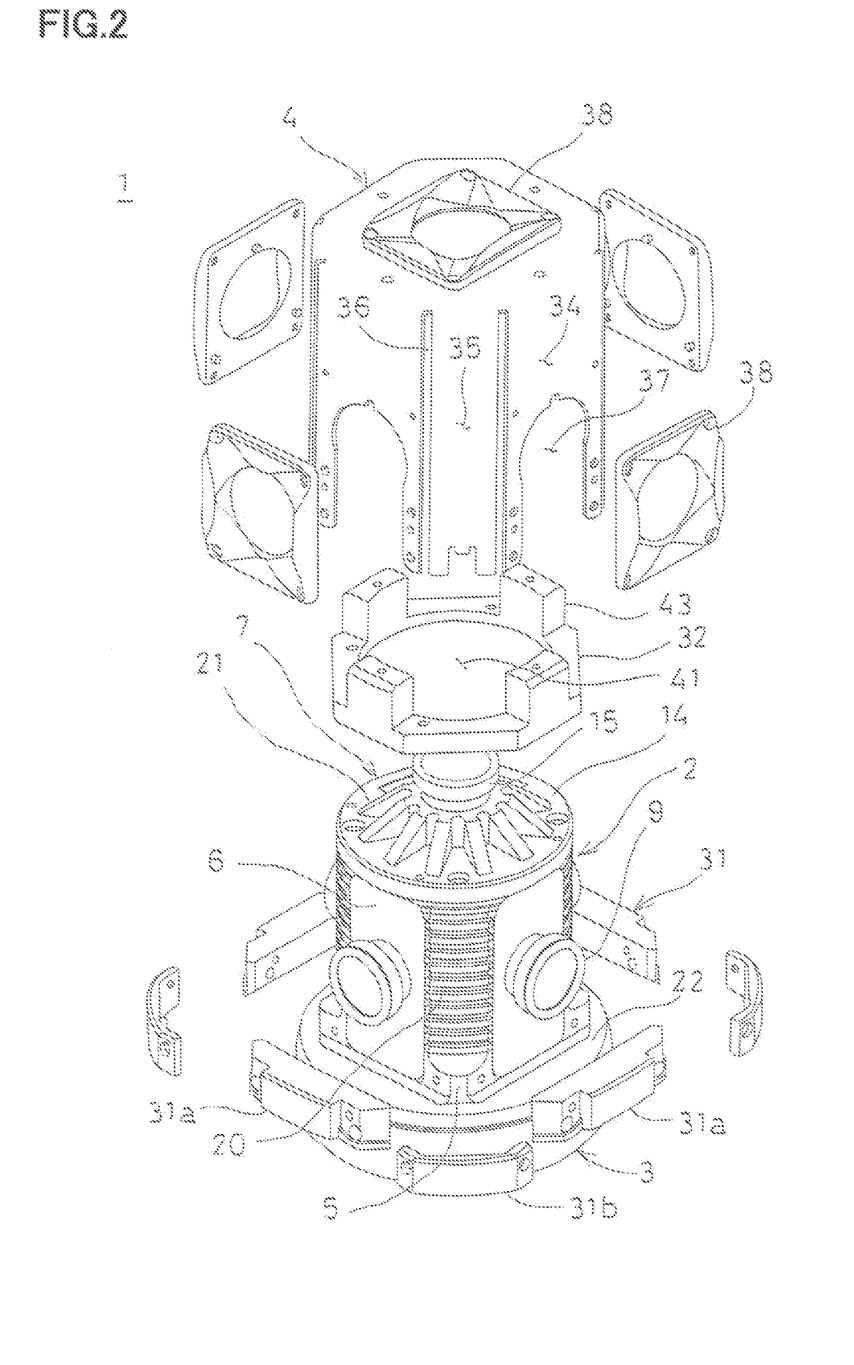
FIG. 2 is an exploded perspective view of the omnidirectional camera.
Figure 3:
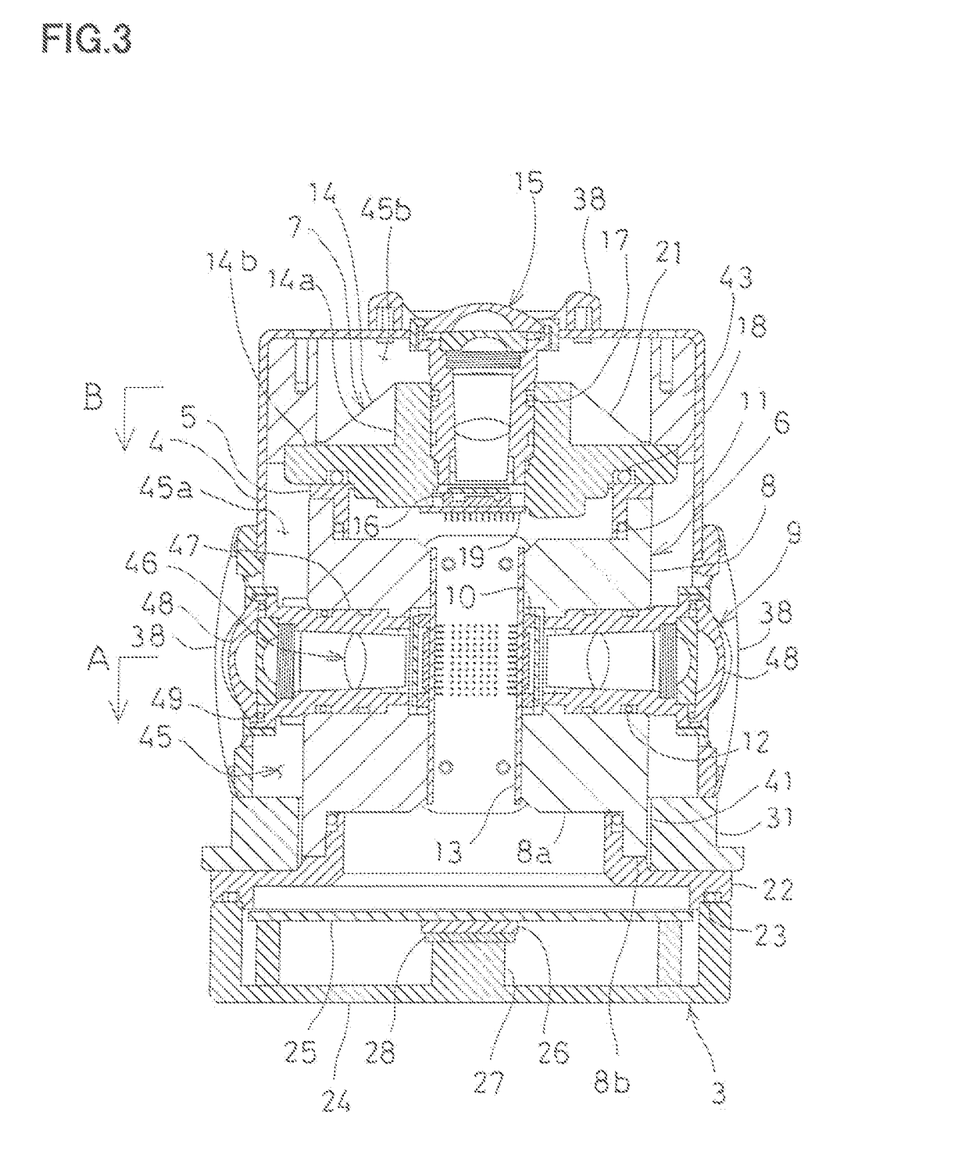
FIG. 3 is a sectional elevational view of the omnidirectional camera.
Figure 4:
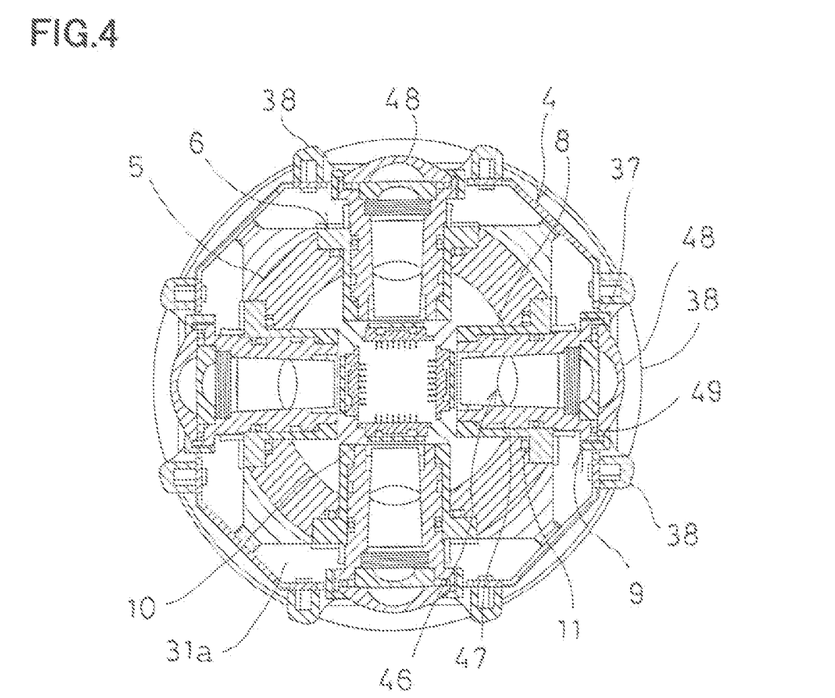
FIG. 4 is an arrow diagram A of FIG. 3.
Figure 5:
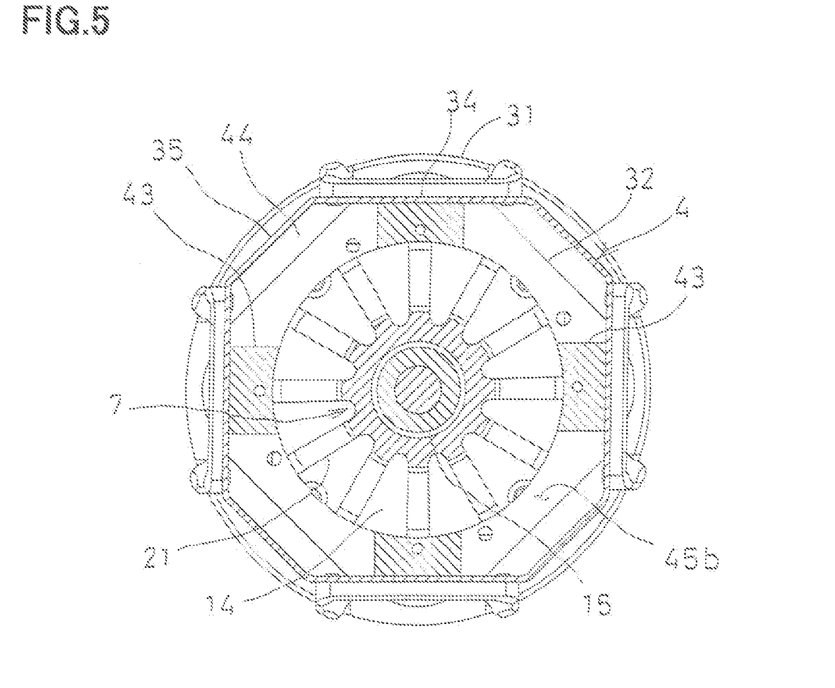
FIG. 5 is an arrow diagram B of FIG. 3.

FIG. 4 and FIG. 5 show a relationship between the lower heat insulating member 31 and the upper heat insulating member 32 in a state that the heat shield cover 4 is put on. A lower end of the heat shield cover 4 is nearly hermetically closed by the lower heat insulating member 31. The upper heating insulating member 32 is in contact with the long-side surfaces 34 every other side and is apart from the short-side surfaces 35 every other adjacent side, and a gap 44 is formed between each short-side surface 35 and the upper heat insulating member 32.

Therefore, the camera mounting frame 5 is held at the center of the heat shield cover 4 by the lower heat insulating member 31 and the upper heat insulating member 32, and a space 45 for heat radiation is formed around the camera mounting frame 5. Additionally, a space 45a formed between the lower heat insulating member 31 and the upper heat insulating member 32 communicates with a space 45b formed above the upper heating insulating member 32 through the gap 44. Further, since the lower heat insulating member 31 and the upper heat insulating member 32 are interposed between the camera, assembly 2 and the heat shield cover 4, the camera assembly 2 and the heat shield cover 4 are thermally insulated from each other.

In the omnidirectional camera 1, it is configured that the camera assembly 2 in liquid-tight structure is accommodated in the open type heat shield cover 4 and further, that the objective lens 48 protrudes from the heat shield cover 4. Therefore, it is enough that only the lens holes 37, which have nearly the same diameters as the first lens unit 9 and the second lens unit 15, are formed on the heat shield cover 4. Also, it is possible to downsize the heat shield cover 4 because it is unnecessary to form wide wind holes. A cost is also decreased because glasses, which cover the wind hole liquid-tightly, are unnecessary.

Further, the objective lens 48 is protected by the lens hood 38 because the lens hood 38 is provided on the hole 37. If the omnidirectional camera 1 falls or the like, a damage or a breakage of the objective lens 48 is prevented.

The omnidirectional camera 1 has a following cooling function.

Typical heat generating members in the omnidirectional camera 1 are the first image pickup element 10, the second image pickup element 16 and the image processing integrated circuit 26.

Heat generated from the first image pickup element 10 is transferred from the ground layer of the first circuit board 13 to the block portion 8a and further transmitted to the camera mounting frame 5 through the flange portion 8b. The first mount block 8 and the camera mounting frame 5 serve as heat radiators, and the heat is radiated into the space 45a from the surface of the flange portion 8b and the surface of the camera mounting frame 5. Furthermore, since the heat radiation fins 20 are formed on the surface of the camera mounting frame 5, the heat is effectively radiated.

Additionally, the heat generated from the second image pickup element 16 is transferred from the ground layer of the second circuit board 19 to the block portion 14a. The heat transferred to the block portion 14a is radiated effectively into the space 45b from the surface of the flange portion 14b and the heat radiation fins 21. Further, a part of the heat is transferred to the camera mounting frame 5 through the flange portion 14b, and the heat is also radiated from the surface of the camera mounting frame 5.

One or both of the heat radiation fins 20 and the radiation fins 21 may be omitted in accordance with a heat radiation state.

The camera assembly 2 has the liquid-tight structure and accommodates the first image pickup element 10 and the second image pickup element 16, which are heating elements, inside, and the heat generated from the first image pickup element 10 and the second image pickup element 16 is efficiently transferred to the camera mounting frame 5, the first mount block 8, and the second mount block 14 through the ground layer and radiated from the surfaces of the camera mounting frame 5, the first mount block 8, and the second mount block 14. Therefore, the camera assembly 2 can be regarded as a heating element as a whole.

The space 45a communicates with the outside of the heat shield cover 4 through the slits 36 and the lens holes 37. Furthermore, the space 45b communicates with the outside through the upper portions of the slits 36 and the periphery of the second lens unit 15. Moreover, the space 45a and the space 45b communicate with each other in up-and-down direction through the gap 44.

Therefore, the airs in the space 45a and the space 45b adjacent to the camera assembly 2 are warmed by the camera assembly 2, the warmed airs flow up without blocking the convection, and an outside air is sucked through the slits 36 and the gap around the first lens unit 9, and the heat from the camera mounting frame 5, the first mount block 8, and the second mount block 14 is effectively discharged to the outside.

As described above, since the camera assembly 2 has the liquid-tight structure, outdoor use is possible under the bad weather, e.g., the rainy weather and others even though the slits 36 are formed in the heat shield cover 4 and the inside and the outside of the heat shield cover 4 can communicate with each other.

Next, the generation of heat by the image processing integrated circuit 26 will now be described.

The heat generated by the image processing integrated circuit 26 is transferred to the bottom case 24 through the heat transfer member 28 and the heat transfer portion 27, and the heat is radiated from the surface of the bottom case 24.

Although the description has been given as to the cooling function of the omnidirectional camera 1 in case where the omnidirectional camera 1 is in a standstill state, the omnidirectional camera 1 is mounted in a mobile object in order to acquire images. For example, the omnidirectional camera 1 is installed on a ceiling of an automobile and acquires an omnidirectional image while moving.

The cooling function during moving of the omnidirectional camera 1 will now be described with reference to FIG. 9.

Figure 9:
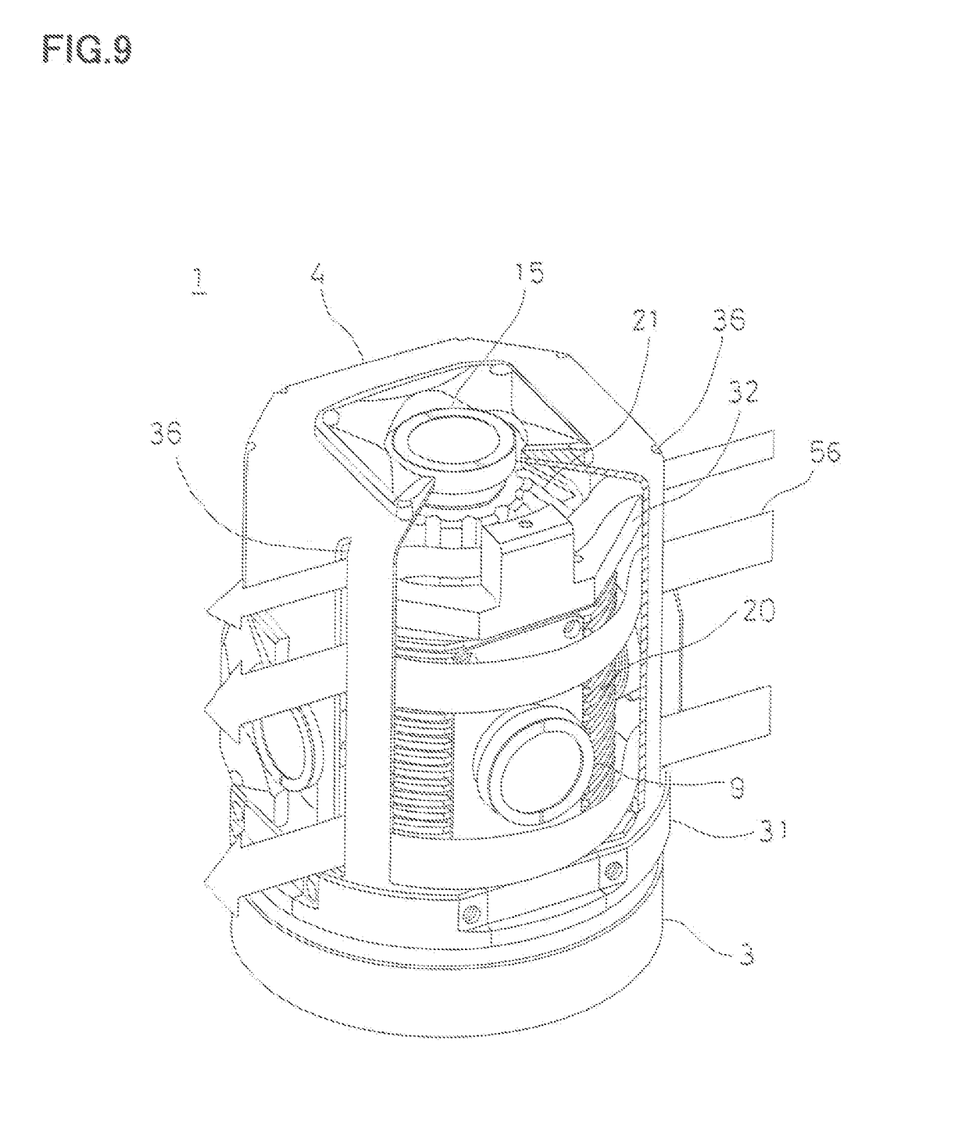
FIG. 9 is a drawing to show a cooling function during moving in a state that the wind blows and FIG. 9 is also a partially cutaway perspective view of a heat shield cover.

FIG. 9 shows a state that the omnidirectional camera 1 is moving to the right side in the drawing. When the omnidirectional camera 1 moves, a wind 56 flows into an inside of the heat shield cover 4 from the slits 36 on the windward and flows out through the slits 36 on the leeward. Therefore, the cooling effect is remarkably improved.

It is to be noted that the cooling effect can be obtained similarly in a state that the wind is blowing, if the omnidirectional camera 1 is at a standstill.

The description will now be given as to a case that the omnidirectional camera 1 is used under high temperature and under the direct sunlight.

When the omnidirectional camera 1 is irradiated with the direct sunlight, the temperature of an irradiated portion becomes considerably high due to the solar heat.

In case of the omnidirectional camera 1, the heat shield cover 4 is irradiated with the direct sunlight and the temperature of the heat shield cover 4 becomes high. On the other hand, the camera assembly 2 is accommodated in the heat shield cover 4, and the head shield cover 4 blocks the direct sunlight. Further, the camera assembly 2 is thermally insulated from the heat shield cover 4 by the lower heat insulating member 31 and the upper heat insulating member 32. Therefore, there is no case where the camera assembly 2 is heated by a heat conduction from the heat shield cover 4.

Further, since the space 45 is formed around the camera assembly 2 and the space 45 communicates with the outside through the slits 36 and the lens holes 37, the heated air is released to the outside by the convection and the heated air is not stagnated inside even if the temperature of the heat shield cover 4 becomes high and the air in the space 45 is heated by the heat shield cover 4.

Therefore, even if the omnidirectional camera 1 is used at a high temperature under the direct sunlight, the omnidirectional camera 1 normally operates.

As for a shape of the heat shield cover 4, a cross section may be circular or rectangular, and any shape can suffice if the heat shield cover 4 can accommodate the camera assembly 2. Furthermore, as for a shape of the upper heat insulating member 32, any shape can suffice if the space 45 above and below the upper heat insulating member 32 communicate with each other. Therefore, a concave portion may be formed around the upper heat insulating member 32, or a hole penetrating in up-and-down direction may be formed in the upper heat insulating member 32. Moreover, although the four horizontal camera units 6 are provided in the foregoing embodiment, three, five or more horizontal camera units 6 may be provided. Additionally, when an image of the upper side does not have to be acquired, the vertical camera unit 7 can be omitted.

Further, a lower end opening portion of the camera mounting frame 5 is liquid-tightly covered by the bottom case 24, but a bottom plate may be additionally provided and this lower end opening portion may be covered liquid-tightly using the bottom plate.

The invention claimed is:

1. An omnidirectional camera, comprising a camera assembly having two or more horizontal camera units provided radially and a cover for accommodating said camera assembly, wherein said horizontal camera has a wide angle lens unit and a rectangular image pickup element which acquires an image through said wide angle lens unit, wherein a lens hole, through which an objective lens of said horizontal camera units come out, is formed on said cover, a lens hood is provided on said cover concentrically with said lens hole, wherein an outer surface of said lens hood is square, with a concave curved surface formed along a diagonal line in a diagonal direction on a surface of said lens hood, wherein four portions separated by said concave curved surface are created, and a height of a portion parallel to a short side of said image pickup element is lower than a height of a portion parallel to a long side of said image pickup element, said lens hood has a shape of surface which does not intercept a field angle of said horizontal camera units, and a height of said portion parallel to said long side of said image pickup element is larger than a protruding amount of said objective lens from said cover.

2. The omnidirectional camera according to claim 1, wherein said camera assembly has a vertical camera unit directed to a vertical direction and said vertical camera has the same structure as said horizontal camera unit.

3. The omnidirectional camera according to claim 1 or claim 2, wherein said camera assembly has seals so as to form a liquid-tight structure and said cover has a ventilation.

4. A lens hood which is provided concentrically with lens units of a wide angle camera unit, wherein a shape of an outer surface of said lens hood is square, with a concave curved surface formed along a diagonal line in a diagonal direction on a surface of said lens hood, wherein four portions separated by said concave curved surface are created, and a height of a portion parallel to a short side of a rectangular image pickup element is lower than a height of a portion parallel to a long side of said image pickup element, wherein said lens hood has a shape which does not intercept a field angle of said wide angle camera unit, and a height of said portion parallel to said long side of said image pickup element is higher than a forward end of said lens units.

* * * * *